Jan. 9, 1945.   E. C. HORTON   2,366,790
ELECTRO-PNEUMATIC WINDOW CONTROL
Filed Nov. 28, 1942

INVENTOR
ERWIN C. HORTON
BY
Bean, Brooks, Buckley & Bean
ATTORNEYS

Patented Jan. 9, 1945

2,366,790

UNITED STATES PATENT OFFICE 2,366,790

ELECTROPNEUMATIC WINDOW CONTROL

Erwin C. Horton, Hamburg, N. Y., assignor to Trico Products Corporation, Buffalo, N. Y.

Application November 28, 1942, Serial No. 467,233

3 Claims. (Cl. 137—144)

This invention relates to a window system for motor vehicles and especially to the fluid type system wherein fluid under pressure is utilized for actuating the individual window motors.

It is the primary object of this invention to provide a window system having a practical arrangement of centralized and individual controls which will facilitate the installation of the system in an automobile and render its operation efficient.

The invention further comprehends a window system of the fluid type having a novel electropneumatic control which is simple and reliable in use.

In the drawing

Figure 1:
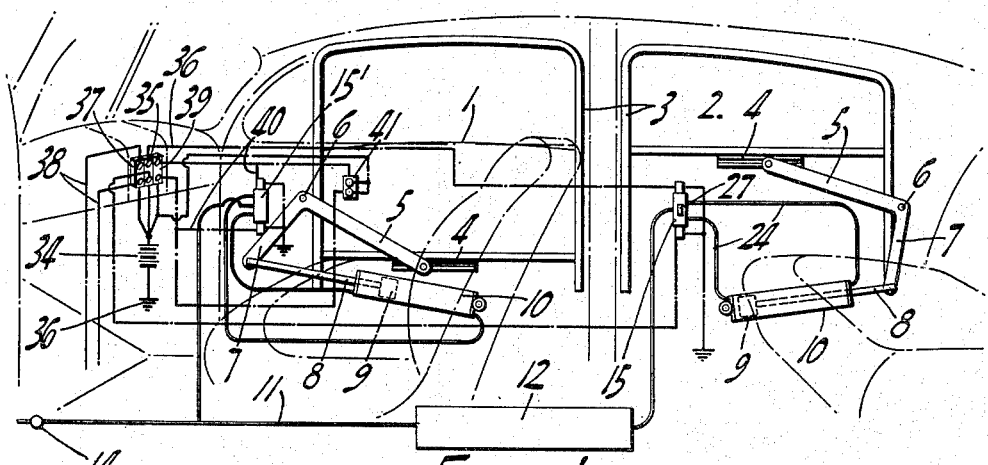
Fig. 1 is a phantom view of the interior of an automobile showing a window system embodying the present invention.

Referring more particularly to the accompanying drawing the numeral 1 designates the right front window and 2 the right rear window of an automobile remote from the driver's side. Each window is guided in vertical ways 3 and is equipped on its lower edge with a bracket 4 slidably connected to the arm 5 of a bell crank lever pivoted at 6. The other arm 7 of the bell crank is pivoted to the rod 8 of a piston 9 which operates in a chamber 10 to form therewith a fluid motor. Fluid pressure for operating the several motors may be derived from the intake manifold as a practcial source, from which leads the pressure line 11 including a reservoir 12 in communication with the control valve associated with each window motor. A check valve 14 in the pressure line will act to conserve the supply of low pressure in the reservoir after the engine has come to rest.

Figures 2, 3:
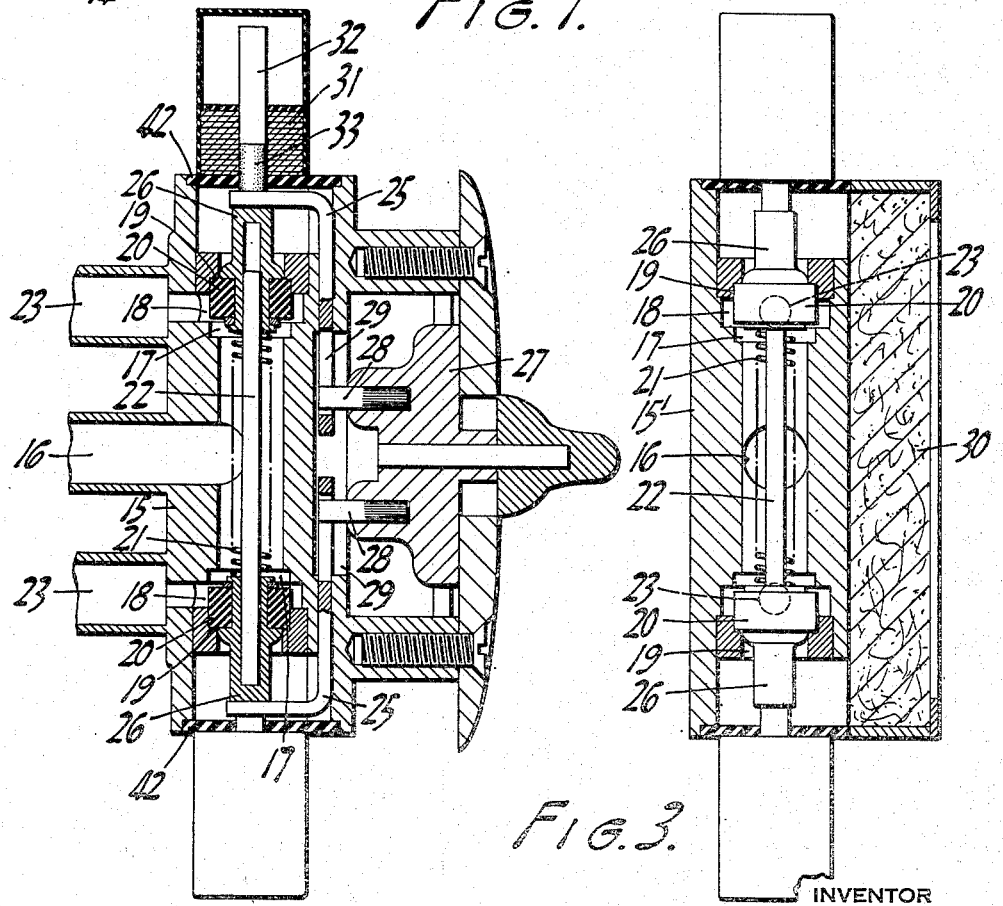
Fig. 2 is a sectional view of the electro-pneumatic control with parts in elevation.
Fig. 3 is a like view of the control in a plane of section displaced ninety degrees from the plane of section of Fig. 2 but slightly modified thereover.

The control valve is shown in detail in Fig. 2 wherein it will be observed that the casing body 15 has a pressure supply passage 16 of T-form with the cross portion opening at its opposite ends through valve seats 17 into valve chambers 18. Opposing each suction seat or port is an atmospheric seat or port 19 on which a valve 20 is normally held engaged by a spring 21. With the several ports in alinement the two valves in their respective chambers may be conveniently guided in their movements by a stem 22 fixed to one valve and slidably supporting the other as shown in Fig. 2. This stem also may serve to support the expansive coiled spring 21 within the cross portion of the supply passage. A motor passage 23 extends laterally from each valve chamber and is connected by conduits 24 to a respective end of the motor chamber so that by properly manipulating a selected one of the valves 20 the motor may be operated. In this present disclosure the valves normally maintain suction on both sides of the piston and when either valve is depressed it vents its side to the atmosphere.

To depress each valve a depressing member 25 may be slidably guided on the casing 15 and formed to overhang a stem 26 on the valve. A common and local actuator 27 has spaced connecting pins 28 engaging in slots 29 to provide a play connection permitting selective depression of either valve independently of the other. A filter pad 30 cleans the air before entering the ports 19. By simply shifting the actuator up or down the selected valve will close off the normal suction communication and vent the respective side of the motor chamber to unbalance and actuate the piston.

The pneumatic control may be mounted on the respective door, or adjacent body portion of the vehicle, to be accessible to the nearby passenger. For a remote operation, accessible to the person driving the vehicle, a remote and electric control is combined with the penumatic. To tnis end an electromagnet 31 may be arranged to have its core or armature 32 act on the stem 26 of each valve, being suitably insulated therefrom or from the depressing member 25 by an insert 33. A battery 34, as a source of electric energy, is connected in circuit to a switch 35 on the instrument board of the vehicle, the circuit wiring for the right rear window being indicated at 36. A switch 37 and circuit wiring 38 control the left rear window (not shown), while a switch 39 and circuit wiring 40 may be provided for the right front window. In this connection it may be mentioned that the penumatic control 15' (Figs. 1 and 3) may be actuated by a local individual switch 41 in lieu of the actuator slide 27 and arranged in parallel circuit with the main switch 39. Such a substitution will enable the pneumatic control's being disposed closer to the motor and in which event the depressing members 25 may be dispensed with, as shown in Fig. 3. The electromagnet is mounted in the line of valve movement by a supporting member 42 which may be engaged in a seat in the casing 15.

From the foregoing it will be observed that the pneumatic control may be operated from a central station on the instrument board, where it is accessible to the driver of the vehicle, or it may be individually operated by the occupant of the adjacent seat. The remote electric operation facilitates the installation of the system in the vehicle while still retaining the advantages of the fluid operation. The fluid control unit is placed on the door along with the fluid motor and the local actuator 27, 41, and consequently there is only a single fluid line to be carried from the door to the source of fluid pressure since the remote control is electric.

The foregoing description has been given in detail for clearness of disclosure and not by way of limitation since the inventive principles may assume other physical embodiments without departing from the spirit or scope herein claimed.

What is claimed is:

1. An electro-pneumatic control comprising a casing body having spaced valve chambers in the opposite ends thereof with an interposed connecting passage, a valve in each chamber independently movable on a common axis and having a stem extending away from the companion valve, electromagnets mounted on the opposite ends of the body and engaging the adjacent stems for selective actuation of the respective valves, and a manual control means comprising an actuator common to both valves and relatively movable parts interposed between the magnets and the stems to depress the latter independently of the magnets, said actuator being joined to the relatively movable parts by play connections which permit electro-magnetic operation of the valves independently of the manual actuator.

2. An electro-pneumatic control of the class described, comprising a casing body with spaced valve means therein, manual actuator means common to both valve means and operable to selectively actuate either valve means, and electromagnetic means for each valve means having a lost motion connection with a part of the manual actuator means to actuate the respective valve means independently of the latter.

3. An electro-pneumatic control of the class described, comprising a casing body with normally closed valve means therein, a pair of depressing members one for each valve means slidably mounted on the body for movement toward and from the companion member and engaging its valve means to open the same, electro-magnetic means for each valve means operable to actuate the respective depressing member, a manual actuator common to both depressing members and slidably mounted on the body, and a play connection between the actuator and each depressing member enabling selective manual operation of both depressing members and electromagnetic operation of either depressing member independently of the manual actuator.

ERWIN C. HORTON.